US005462787A

United States Patent [19]

Yamamoto et al.

[11] Patent Number: 5,462,787

[45] Date of Patent: Oct. 31, 1995

[54] RECORDING MEDIUM FOR BUSINESS MACHINES, PRODUCTION THEREOF, AND INK-JET RECORDING METHOD EMPLOYING THE SAME

[75] Inventors: Tohru Yamamoto; Shigeo Yoshida, both of Shiga, Japan

[73] Assignee: Canon Kabushiki Kaisha, Tokyo, Japan

[21] Appl. No.: 102,304

[22] Filed: Aug. 5, 1993

[30] Foreign Application Priority Data

| | | | |
|---|---|---|---|
| Aug. 13, 1992 | [JP] | Japan | 4-216214 |
| Sep. 11, 1992 | [JP] | Japan | 4-243655 |
| Mar. 31, 1993 | [JP] | Japan | 5-074301 |

[51] Int. Cl.$^6$ .......... B32B 3/00

[52] U.S. Cl. .......... 428/195; 428/206; 428/207; 428/411.1; 428/913; 428/914; 523/200; 525/243

[58] Field of Search .......... 523/200; 428/195, 428/913, 914, 206, 207, 339, 331, 518, 520, 411.1; 525/243

[56] References Cited

U.S. PATENT DOCUMENTS

| | | | |
|---|---|---|---|
| 5,017,227 | 5/1991 | Koike et al. | 106/22 |
| 5,082,496 | 1/1992 | Yamamoto et al. | 106/22 |
| 5,110,356 | 5/1992 | Shirota et al. | 106/22 |
| 5,130,723 | 7/1992 | Yamamoto et al. | 346/1.1 |
| 5,135,570 | 8/1992 | Eida et al. | 106/22 |
| 5,139,573 | 8/1992 | Yamamoto et al. | 106/22 |
| 5,178,671 | 1/1993 | Yamamoto et al. | 106/22 K |
| 5,215,577 | 6/1993 | Eida et al. | 106/22 K |
| 5,216,437 | 6/1993 | Yamamoto et al. | 346/1.1 |
| 5,231,417 | 7/1993 | Shirota et al. | 346/1.1 |
| 5,262,486 | 11/1993 | Telser et al. | 525/243 |

FOREIGN PATENT DOCUMENTS

| | | |
|---|---|---|
| 0444950 | 9/1991 | European Pat. Off. . |

*Primary Examiner*—Patrick J. Ryan
*Assistant Examiner*—William A. Krynski
*Attorney, Agent, or Firm*—Fitzpatrick, Cella, Harper & Scinto

[57] ABSTRACT

A recording medium for business machines has an ink-receiving layer provided on a substrate. The ink-receiving layer comprises a highly water-absorbent material in which an organic material selected from acrylic acids and polyacrylic acids and an inorganic material selected from inorganic alkoxides and metal alkoxides are grafted.

10 Claims, No Drawings

RECORDING MEDIUM FOR BUSINESS MACHINES, PRODUCTION THEREOF, AND INK-JET RECORDING METHOD EMPLOYING THE SAME

BACKGROUND OF THE INVENTION

1. Field of the Invention

The present invention relates to a recording medium for business machines suitable for recording with ink, and to a process of production of the recording medium. In particular, the present invention relates to a recording medium for business machines which is excellent in ink receptability, sharpness of recorded color images, water-resistance, light-fastness, and anti-blocking property, and to a process for producing the recording medium.

The present invention also relates to an ink-jet recording method employing the above recording medium.

2. Related Background Art

The ink-jet recording is attracting attention because of less noise, and capability of high-speed and multi-color printing. The ink-jet recording is a method in which droplets of an ink (or a recording liquid) are formed and ejected by an electrostatic attraction, a mechanical vibration or displacement caused by a piezoelectric element, or pressure caused by heating and foaming, or the like to deposit a part or whole of the ink on a recording medium such as a paper sheet.

The recording medium for the business machines includes recording mediums for copying machines and printers of ink-jet type, electrophotography type, thermal transfer type, ink ribbon type, sublimation transfer type, and so forth.

The ink for ink-jet recording contains water as the main component in view of safety and recording characteristics, and frequently contains additionally a polyhydric alcohol for the purpose of prevention of orifice clogging and improvement of ejection stability.

Hitherto, plain paper sheets, or recording media called ink-jet recording paper having a porous ink-receiving layer on a substrate have been used for ink-jet recording. With improvement for high-speed recording and multi-color printing and propagation of use of ink-jet recording, the ink-jet recording medium is required to have further improved properties for wider application range. The ink-jet recording medium is demanded to satisfy the basic requirements as shown below for obtaining recording mediums of higher resolution and higher quality of recorded images:

(1) the recording medium accepts rapidly the ejected ink, (2) the accepted ink does not flow into the later accepted ink when the ink dots become superposed, (3) the ink does not diffuse excessively on the recording medium in order to prevent undesired enlargement of ink dot diameters, (4) the ink dots on the recording medium are nearly in a complete circle shape, and have smooth perimeter, and (5) the ink dots give high OD (optical density), and sharp perimeter.

In multi-color ink-jet recording, the recording medium is demanded to satisfy further the requirements below in addition to the above requirements (1) to (5):

(6) color-developing properties is excellent at the ink-deposited portion of the recording medium, (7) ink fixation is particularly excellent (because ink droplets in the same number of ink as the number of ink color may possibly superposed on the same spot.

(8) the recording medium has gloss at the surface, (9) the recording medium has high whiteness or high transparency,

(10) the recording medium and the image formed thereon has high water-resistance,

(11) the recorded image has high light-fastness, and

(12) the surface does not become sticky even at a high temperature and a high humidity, and exhibits high anti-blocking properties.

The recorded images formed by ink-jet recording have been used only for surface image observation. However, with improvement and propagation of ink-jet recording apparatuses, recording media are required to be suitable also for image observation other than the surface observation. For example, recording media are required to be suitable for observation of images projected on a screen or the like by use of an optical device such as a lantern slide and an OHP (overhead projector); color separation filters for preparing a positive plate of color printing; a CMF (color mosaic filter) for color display by use of liquid crystal; and so forth.

In the recording medium used for surface image observation, the diffused light from the recorded image is mainly observed, while in the recording mediums for non-surface image observation, transmitted light is mainly observed. Therefore, the recording medium for non-surface image observation is required to have high light-transmissivity (especially, linear light transmittance) in addition to the above-described general requirements on ink-jet recording medium.

Nevertheless, no recording medium has been obtained which satisfies all of the above requirements at the moment.

Most of the recording media for surface image observation have a porous inorganic ink-receiving layer on the surface, and the ink is received and fixed in the voids of the pores. Such a recording medium, because of the porosity of the surface, does not have gloss, and needs to have a certain thickness of the ink-receiving layer for absorption of ink. On the other hand, another type of recording medium, which has a non-porous and water-soluble resin layer as the ink-receiving layer on the surface, has disadvantages that involatile materials such as polyhydric alcohol in the ink remains at the surface of the recording medium for a long time to delay drying and fixing of the ink, thereby causing staining of clothes, peeling of the layer, and impairment of the recorded image.

SUMMARY OF THE INVENTION

The present invention intends to provide a recording medium for business machines which is excellent in ink receptability, sharpness of recorded color images, water-resistance, light-fastness, and anti-blocking property, and to provide a process for producing the recording medium.

The present invention also intends to provide an ink-jet recording method which gives high-quality color images.

The present invention further intends to provide a recording medium for business machines which is suitable for a recording medium for observation of images projected on a screen or the like by use of an optical device such as a lantern slide and OHP (overhead projector); a color separation filter for preparing a positive plate of color printing; a CMF (color mosaic filter) for color display by use of liquid crystal; and so forth.

The recording medium for business machines of the present invention has an ink-receiving layer provided on a substrate, and the ink-receiving layer comprises a highly water-absorbent material in which an organic material selected from acrylic acids and polyacrylic acids and an inorganic material selected from inorganic alkoxides and metal alkoxides are grafted.

In another aspect of the present invention, the recording medium for business machines has an ink-receiving layer provided on a substrate, and the ink-receiving layer comprises a highly water-absorbent material which is formed by reactions including graft polymerization of at least one (poly)acrylic acid selected from acrylic acids and polyacrylic acids and at least one alkoxide selected from inorganic alkoxides and metal alkoxides.

The process for producing the recording medium for business machines of the present invention comprises preparing separately Solution A containing a (poly)acrylic acid selected from acrylic acids and polyacrylic acids, and a basic compound, and Solution B containing at least one alkoxide selected from inorganic alkoxides and metal alkoxides and an acidic catalyst; mixing the Solution A and the Solution B; and applying the mixture of the Solution A and the Solution B on a substrate to form an ink-receiving layer.

The ink-jet recording method of the present invention conducts recording by applying an aqueous ink on the above recording medium.

DESCRIPTION OF THE PREFERRED EMBODIMENT

The acrylic acids and the polyacrylic acids (referred to collectively as "(poly)acrylic acids") includes acrylic acid, methacrylic acid, acrylamide, polyacrylic acid, polymethacrylic acid, and salts thereof (e.g., potassium acrylate, sodium polyacrylate, etc.). Of these, acrylic acid and polyacrylic acid are preferred. The (poly)acrylic acid is used in an amount of from 100 to 1100 parts by weight to 100 parts by weight of the alkoxide.

In the present invention, the term "inorganic alkoxide" means an inorganic-alkoxide other than metal alkoxides.

The inorganic alkoxide or the metal alkoxide (hereinafter referred to as "alkoxide") is represented by the general formula: $M(OR)_m$, where M is an atom of an inorganic substance or metal. The atom of metal includes Li, Na, Cu, Mg, Ca, Sr, Ba, Zn, B, Al, Ga, Y, Si, Ge, Pb, P, Sb, Ta, W, La, Nd, Ti, etc. R is a lower alkyl (having 1 to 4 carbons), m is the valence of M. The alkoxide includes $Si(OC_2H_5)_4$, $Al(O\text{-iso-}C_3H_7)_3$, $Ti(O\text{-iso-}C_3H_7)_4$, $Zr(O\text{-t-}C_4H_9)_4$, $Zr(O\text{-n-}C_4H_9)_4$, $Ca(OC_2H_5)_2$, $Fe(OC_2H_5)_3$, $V(O\text{-iso-}C_3H_7)_4$, $Sn(O\text{-t-}C_4H_9)_4$, $Li(OC_2H_5)$, $Be(OC_2H)_2$, $B(OC_2H_5)_3$, $P(OC_2H_5)_3$, $P(OCH_3)_3$, $Mg(OCH_3)_2$, $Mg(OC_2H_5)_2$, etc.

The highly water-absorbent material employed in the present invention is prepared from the aforementioned (poly)acrylic acid and the alkoxide by reactions including hydrolysis and polycondensation of the alkoxide, and graft polymerization of the (poly)acrylic acid. In the reactions, a basic compound is employed. This basic compound is preferably at least one selected from the group of hydroxides of alkali metals or alkaline earth metals (e.g., KOH and NaOH), ammonia, organic amines, and organic amides.

The organic amine as the above basic compound is preferably at least one selected from the group of aromatic primary, secondary, and tertiary amines, aliphatic primary, secondary, and tertiary amines, cyclic amines, and nitrogen-containing heterocyclic aromatic compounds. Specific examples of the organic amines include N,N-dimethylbenzylamine, tripropylamine, tributylamine, tripentylamine, diethylamine, triethylamine, n-propylamine, di-n-propylamine, tri-n-propylamine, n-butylamine, n-amylamine, n-hexylamine, laurylamine, ethylenediamine, trimethylenediamine, tetramethylenediamine, pentamethylenediamine, hexamethylenediamine, ethanolamine, diethanolamine, triethanolamine, allylamine, aniline, tribenzylamine, tri-n-butylamine, tripropargylamine, N,N,N-trimethylethylenediamine, tri-n-hexylamine, pyridine, piperidine, morpholine, and the like. Of these, tertiary amines which are soluble in an organic solvent, and substantially insoluble in water are suitably used for the catalytic reactions described later. N,N-dimethylbenzylamine is particularly preferred.

As the above organic amide, N,N-methylene-bis-acrylamide is suitably used.

Such a basic compound inherently serves as a reaction catalyst for polycondensation of hydrolysis product of an alkoxide in a sol-gel process, and also serves as a neutralizing agent for neutralizing the carboxylic acid group of the (poly)acrylic acid. It serves also as the catalyst for polymerization of the (poly)acrylic acid and for self-grafting reaction. It further serves as the catalyst for bonding of the (poly)acrylic acid to the polycondensed alkoxide by graft reaction.

The aforementioned alkali metal hydroxide or alkaline earth hydroxide serves mainly as a neutralizing agent. The hydroxide is used in an amount of from 70 to 80 mol% relative to 100 mol% of the (poly)acrylic acid. When the (poly)acrylic acid is partially or wholly in a form of a salt thereof, such a neutralizing agent need not be used.

The aforementioned organic amines and organic amides are capable mainly of catalyzing polycondensation of the hydrolysis product of the alkoxide, and graft-polymerization of the (poly)acrylic acid. Such an amine or amide, in the reaction system, serves as mentioned above as the catalyst for polycondensation of hydrolysis product of the alkoxide, and for self-polymerization and graft-polymerization of the (poly)acrylic acid among themselves, and also for bonding the (poly)acrylic acid by grafting reaction onto the three-dimensional network structure of the alkoxide formed by the above polycondensation. The basic compound as the reaction catalyst is used in an amount of from 0.1 to 70 parts by weight to 100 parts of the (poly)acrylic acid.

The solvent for the above reactions is a mixed solvent of water (to be consumed in hydrolysis), and a water-miscible or partially water-soluble organic solvent. The organic solvent includes methanol, ethanol, butanol, propanol, pentanol, hexanol, acetone, methyl ethyl ketone, and formamide. Of these, alcohols are preferred. The water is used in an amount of from 2 to 10 mol, preferably from 4 to 8 mol per mol of the alkoxide.

To accelerate the hydrolysis of the alkoxide, an acid catalyst is usually employed in the present invention. The acid catalyst includes inorganic acids and organic acids. The inorganic acids include hydrochloric acid, sulfuric acid, and nitric acid. The organic acids include tartaric acid, phthalic acid, maleic acid, dodecylsuccinic acid, hexahydrophthalic acid, methylnudic acid, pyromellitic acid, benzophenonetetracarboxylic acid, dichlorosuccinic acid, and chlorendic acid. The catalyst acid is used in amount of from 0.001 to 0.03 mol, preferably from 0.002 to 0.01 mol per mol of the alkoxide.

The substrate for the recording medium of the present invention may be any of conventional known transparent substrates and opaque substrates. The transparent substrates include films and plates made of a resin such as polyester resins, diacetate resins, triacetate resins, acrylic resins, polycarbonate resins, vinyl chloride resins, polyimide resins, and celluloid; cellophane sheets; and glass plates, etc. The opaque substrates include paper sheets, cloths, wood plates, metal plates, and opacified substrates made by opacifying the above transparent substrate by a known method.

The recording medium of the present invention is prepared according to the procedure described below.

The aforementioned basic compound is added to the (poly)acrylic acid. If necessary, a suitable solvent such as alcohol and water may be used. Thereby the carboxylic acid group is partly neutralized by the basic compound, and self polymerization reaction (or self-crosslinking reaction) proceeds. The degree of neutralization of the carboxylic acid is preferably from about 70% to 100%. Thus the monomer such as acrylic acid and methacrylic acid polymerizes and the polymer or the oligomer such as polyacrylic acid and methacrylic acid undergoes self-polymerization into a polymer having three-dimensional network structure. The above mixture is referred to as "Solution A".

Separately, the aforementioned alkoxide, a water-containing solvent, and optionally the above acid catalyst are mixed. This mixture is referred to as "Solution B".

Then Solution A and Solution B are mixed. The mixing ratio is preferably in the range of from 5 to 50 parts by weight of Solution B to 100 parts by weight of Solution A. The resulting solution is mixed and stirred for about one hour. Thereby the alkoxide in Solution B hydrolyses and condenses into polycondensate having three-dimensional network structure, and thereon the (poly)acrylic acid in Solution A polymerizes to form a graft polymer. Into the above Solution A and/or Solution B, or the mixture thereof, another polymer, a filler, or the like may further be added, if necessary.

The polymer which may further be added includes natural resins such as albumin, gelatin, casein, starch, cationic starch, gum arabic, and sodium alginate; and synthetic resins such as polyamides, polyacrylamides, polyethyleneimines, polyvinylpyridinium hydrides, melamine resins, polyurethanes, carboxymethylcelluloses, polyvinyl alcohols, polyesters, sodium polyacrylates, SBR latexes, NBR latexes, polyvinylformals, polymethyl methacrylates, polyvinylbutyrals, polyacrylonitriles, polyvinyl chlorides, polybutyl acetates, phenol resins, and alkyd resins. These resins may be used singly or in combination of two or more thereof.

The filler includes colloidal silica, amorphous silica, clay, talc, diatomaceous earth, calcium carbonate, calcium sulfate, barium sulfate, aluminum silicate, synthetic zeolite, alumina, zinc oxide, lithopon, satin white, and the like. When the transparency of the recording medium is required, the filler is added in an amount not to impair the transparency of the resulting recording mediums.

To form the recording layer, the mixed solution containing the above Solution A and Solution B is applied on the surface of the substrate in a usual manner. For example, the mixed solution is applied on the aforementioned transparent substrate by roll coating, rod-bar coating, spray coating, air knife coating, or other coating method. The applied solution on the substrate is dried by heating the substrate up to the temperature ranging from 100° to 150° C., or is subjected to high frequency treatment to form a highly water-absorbent film on the surface of the substrate. Otherwise, the above highly water-absorbent material is formed into a sheet for an ink-receiving layer by casting or other molding method, and the formed sheet is laminated onto the substrate to prepare a recording medium.

The highly water-absorbent material used in the present invention is prepared, as described above, from an alkoxide, a (poly)acrylic acid, and a basic compound. This material has a structure in which a water-absorbent self-polymerized polymer formed from a (poly)acrylic acid is grafted onto a three-dimensional network of an inorganic (hydrophobic) polymer formed from an alkoxide.

Since the highly water-absorbent material used in the present invention has high transparency, a recording medium having high light-transmission properties is prepared by using a transparent substrate. The recording medium thus obtained has satisfactory transparency, and is useful as a recording medium for an optical apparatus for transmitted light observation such as an OHP by which recorded image is projected on a screen. A recording medium exhibiting linear light transmittance of 2% or more enables observation of a recorded image projected on a screen by an OHP or the like. In order to observe clearly the detail of the recorded image, the linear light transmittance is preferably not less than 10%.

The rectilinear light transmittance (T) (%) in the present invention is derived as below. A light beam is introduced to a sample perpendicularly, and is allowed to transmit through the sample and to pass through a slit which is 8 cm or more apart from the sample and is on the extension line of the optical path. The spectral transmittance of the rectilinear light is measured by a detector placed behind the slit by use of a spectrophotometer (e.g., Hitachi automatic spectrophotometer: Model 323, made by Hitachi, Ltd.). From the measured spectral transmittance, the Y value of tristimulus values is derived. The rectilinear light transmittance is obtained according to Equation (I) below:

$$T=(Y/Y_o)\times 100 \quad (I)$$

where T is the rectilinear light transmittance, Y is the Y value of the sample, and $Y_o$ is a blank value of Y.

The rectilinear light transmittance is a transmittance of the straight light, and is different from diffusion light transmittance, which is measured by providing a integrating sphere to include diffused light, and is also different from opacity, which is derived by ratio measured by placing white or black backing. The rectilinear light transmittance of the recording medium is particularly important in evaluation of the recording medium for an apparatus utilizing optical technique since in such an apparatus the behavior of the rectilinear light is important.

In observation of an image projected by an OHP, for example, brightness of non-recorded portion of the projected image is required to obtain high contrast between a recorded portion and a non-recorded portion and to obtain sharp and easily observable image: in other words, the rectilinear light transmittance of the recording medium is required to be above a certain level. In a test with an OHP by use of a test chart, it was found that the rectilinear light transmittance needs to be not less than 2%, preferably not less than 10% in order to form the image suitable for the above object. Accordingly, the recording medium for this purpose is required to exhibit rectilinear light transmittance of 2% or higher.

The highly water-absorbent material in the present invention is constituted of ultra-fine porous inorganic particles formed by hydrolysis of an alkoxide and a (poly)acrylic acid grafted thereon, as mentioned above. Such a material has a larger specific surface area owing to the ultra-fine porous inorganic material, exhibiting high ink-receptability, and is excellent in water-resistance owing to the graft structure.

Further, the fineness of the porous material gives the high transparency.

The ink-receiving layer formed on the substrate in the present invention has normally a thickness of from about 1 to 200 μm, preferably for abut 5 to 100 μm.

The recording medium of the present invention may also be made by impregnating the highly water-absorbent material into a paper sheet having an area larger than a certain level by use of a size press, or by forming the above ink-receiving layer in a larger thickness and then peeling off of the substrate.

The lastly mentioned recording medium prepared by forming the above ink-receiving layer in a larger thickness on a substrate and then peeling off of the substrate therefrom may be formed by use of substantially the same material and in the same method as in the previously described recording medium. This recording medium may contain a filler so that the ink-receiving layer may accept ink rapidly. The filler includes, in addition to the previously enumerated fillers, organic particulate materials such as polystyrenes, polyethylenes, urea-formalin resins, polyvinyl chlorides, and polymethyl methacrylate, a combination of two or more thereof. Such a filler is used preferably in an amount of from about 10% to about 90 % by weight of the ink-receiving layer. At the filler content of less than 10% by weight, the ink-receptability is not sufficient, while at the filler content of more than 90% by weight, the resulting ink-receiving layer has insufficient physical and mechanical strength.

The recording mediums described above are typical examples, and the recording medium of the present invention is not limited thereto. The above-mentioned ink-receiving layers may contain a known additive such as a dispersant, fluorescent dye, a pH controller, an anti-foaming agent, a lubricant, an antiseptic agent, a surfactant, etc. Further, the recording medium of the present invention is not necessarily be colorless, but may colored by a known coloring agent.

The recording medium for business machines of the present invention has excellent ink receptability. Therefore, even when different colors of ink droplets are attached in superposition in a short time, neither flow-out of the ink nor feathering of ink arises, and a sharp and clear image is obtained with high resolution, high water-resistance, high light-fastness, and high anti-blocking properties. Furthermore, the recording medium for business machines of the present invention can be made to have surface gloss which could not be achieved with conventional ink-jet recording medium for business machines, and therefore is useful in applications other than conventional surface image observation, in applications such as recording mediums for optical apparatuses, e.g., a lantern slide and an OHP, which project a recorded image on a screen; a color separation filter for preparing a positive plate of color printings; a CMF (color mosaic filter) for color display by use of liquid crystal, and so forth. The recording medium for business machines of the present invention is not only useful for ink-jet recording but also useful for any recording method using aqueous ink.

The present invention is described below in more detail. In Examples, the term "part" is based on weight.

[Method of Evaluation ]

Ink-jet recording was conducted on the recording mediums of Examples and Comparative Examples by use of four kinds of inks shown below by means of an on-demand type of ink-jet recording apparatus which ejects ink through orifices by action of thermal energy.

| | |
|---|---|
| (Yellow Ink Composition) | |
| C.I. Direct Yellow 86 | 2 parts |
| Diethylene glycol | 20 parts |
| Polyethylene glycol #200 | 10 parts |
| Water | 70 parts |
| (Magenta Ink Composition) | |
| C.I. Acid Red 35 | 2 parts |
| Diethylene glycol | 20 parts |
| Polyethylene glycol #200 | 10 parts |
| Water | 70 parts |
| (Cyan Ink Composition) | |
| C.I. Direct Blue 86 | 2 parts |
| Diethylene glycol | 20 parts |
| Polyethylene glycol #200 | 10 parts |
| Water | 70 parts |
| (Black Ink Composition) | |
| C.I. Food Black 2 | 2 parts |
| Diethylene glycol | 20 parts |
| Polyethylene glycol #200 | 10 parts |
| Water | 70 parts |

(Ink Fixing Time)

After completion of the recording, the recording mediums for business machines are left standing at a temperature of 10° C. and a relative humidity of 30%; at a temperature of 20° C. and a relative humidity of 65%; and at a temperature of 26° C. and a relative humidity of 75%, respectively. Fixing of the ink is tested by touching the recorded image with a finger, and the time length in average for four inks before the ink has come not to stain the finger was measured.

(Dot Density)

Micro-dot printing was prepared with black ink, and the dot density was measured according to JIS K 7505 by Sakura Microdensitometer PDM-5 (Konishtroku Photo Industry Co., Ltd.).

(Aptitude for OHP)

The recorded image was projected onto a screen by an OHP, and the projected image was evaluated visually. Images were recorded freehand by use of the above ink-jet (A), a commercial aqueous-ink pen (B)(made by Pilot Corporation), and another commercial aqueous-ink pen (C)(made by Pentel K.K.). The evaluation symbol "A" shows that the recorded image has brightness in the non-recorded portion and a high OD (optical density) of the recorded image with high contrast and sharpness. The evaluation symbol "B" shows that, in the projected image, non-recorded portion is slightly dark, the OD of the recorded portion is slightly low, and lines of 0.2 mm thick in 0.5 mm pitch breadth are not clearly distinguished. The evaluation symbol "C" shows that, in the projected image, the non-recorded portion is considerably dark, the OD of the recorded portion is considerably low, lines of 0.3 mm thick in 1 mm pitch is not clearly distinguished. In the case of the ink-jet A, evaluation was made by average of four kinds of inks.

(Rectilinear Light Transmittance)

The spectral transmittance was determined by means of Hitachi Automatic Spectrophotometer Model 323 (made by Hitachi Ltd.) with the distance from the sample to the light-receiving window kept at about 9 cm. The rectilinear light transmittance is obtained according to Equation (I) below:

$$T=(Y/Y_o)\times 100 \quad (I)$$

where T is the rectilinear light transmittance, Y is the Y value of the sample, and $Y_o$ is a blank value of Y. The measurement was conducted for the four colors of inks, and the average of the measured values was derived.

(Light-fastness)

The sample was exposed to light irradiation by use of Xenon Fadeometer FAL-25AX-HC (made by Suga Tester K.K.), and color difference (Lab) from the non-irradiated sample was determined with NP-1001DP (made by Nippon Denshoku K.K.) for respective four colors.

(Blocking)

One hour after the printing, a sheet of wood-free paper was brought into close contact with the printed image face, and was kept in that state for 12 hours. Then occurrence of the sticking between the recording medium and the wood-free paper sheet was observed. The symbol "B" shows that no sticking occurs. The symbol "C" shows that sticking occurs. The same test was conducted 10 minutes after the printing. The symbol "A" shows that no sticking occurs in the latter test. The results are shown by the average of the four inks.

(Deliverability)

The recording medium was set on a printer under the conditions of a temperature of 26° C. and a relative humidity of 75%, and subjected to printing. The symbol "C" shows that the recording medium is not deliverable by the delivering roller owing to sticking of the surface of the ink-receiving layer. The symbol "B" shows that the recording medium is practically usable. The symbol "A" shows that recording is conducted satisfactorily.

(Overall Evaluation)

The above characteristics were collectively evaluated. The symbol "A" shows that the tested material is excellent as a recording medium. The symbol "B" shows that the tested material is practically usable. The symbol "C" shows that the tested material is not useful as a recording medium.

Example 1

Solution A and Solution B shown below was mixed in a weight ratio of 87.7 : 12.3. The pH of the mixture was adjusted to 6, and the mixture was stirred at room temperature for about one hour to allow the mixture to undergo reactions of hydrolysis, polycondensation, and grafting. Thereby a solution was obtained which contains a highly water-absorbent hybrid polymer.

| | |
|---|---|
| (Solution A) | |
| Polyacrylic acid solution (25% in water) | 46.51% by wt. |
| N,N-dimethylbenzylamine | 6.98% by wt. |
| Ethanol | 46.51% by wt. |
| Total | 100.00% by wt. |
| (Solution B) | |
| Ethyl silicate | 65.53% by wt. |
| 2N HCl | 0.49% by wt. |
| $H_2O$ | 33.98% by wt. |
| Total | 100.00% by wt. |

The resulting highly water-absorbent hybrid polymer solution was applied on a transparent PET film of 100 μm thick and was dried by a drier at 120° C. for about one minute. Thereby a transparent film of the highly water-absorbent polymer of 25 μm thick was formed on the surface of the PET film.

The obtained recording medium for business machines was tested for ink-fixing time, dot density, aptitude for OHP, rectilinear light transmittance, light-fastness, blocking properties, deliverability, and overall evaluation as described above. The results are shown in Table 1 together with the results of later-described Examples 2 to 5.

Example 2

Solution A and Solution B shown below was mixed in a weight ratio of 77.32 : 22.68. The pH of the mixture was adjusted to 6, and the mixture was stirred for about one hour to allow the mixture to undergo reactions of hydrolysis, polycondensation, and grafting. Thereby a solution was obtained which contains a highly water-absorbent hybrid polymer.

| | |
|---|---|
| (Solution A) | |
| Polyacrylic acid solution (25% in water) | 66.67% by wt. |
| Sodium polyacrylate | 9.33% by wt. |
| N,N-dimethylbenzylamine | 12.00% by wt. |
| Methanol | 12.00% by wt. |
| Total | 100.00% by wt. |
| (Solution B) | |
| Ethyl silicate | 20.95% by wt. |
| 2N HCl | 0.15% by wt. |
| $H_2O$ | 10.71% by wt. |
| Methanol | 68.19% by wt. |
| Total | 100.00% by wt. |

The resulting highly water-absorbent hybrid polymer solution was applied on a transparent PET film of 100 μm thick and was dried by a drier at 120° C. for about one minute. Thereby a transparent film of the highly water-absorbent polymer of 25 μm thick was formed on the surface of the PET film.

The obtained recording medium for business machines was tested for ink-fixing time, dot density, aptitude for OHP, rectilinear light transmittance, light-fastness, blocking properties, deliverability, and overall evaluation as described above.

Example 3

The highly water-absorbent hybrid polymer solution used in Example 1 was sprayed onto a nonwoven fabric sheet, and the nonwoven fabric sheet was pressed with rolls to allow the polymer solution to penetrate into the sheet. The sheet was treated at 120° C. for one minute with a drier, and was subjected to high frequency treatment for 2 minutes, thus a recording medium for business machine was prepared.

The resulting recording medium for business machines was tested for ink-fixing time, dot density, light-fastness, blocking properties, deliverability, and overall evaluation as described above.

Example 4

A recording medium for business machines was prepared in the same manner as in Example 3 except that the mixing ratio of Solution A and Solution B was changed to 92 : 8.

The resulting recording medium for business machines was tested for ink-fixing time, dot density, light-fastness, blocking properties, deliverability, and overall evaluation as described above.

Example 5

A recording medium for business machines was prepared by applying the highly water-absorbent hybrid polymer solution used in Example 2 on a wood-free paper sheet as the substrate.

The resulting recording medium for business machines was tested for ink-fixing time, dot density, light-fastness, blocking properties, deliverability, and overall evaluation as described above.

Comparative Example 1

A recording medium for business machines was prepared in the same manner as in Example 2 except that N,N-dimethylbenzylamine was not used in Solution A for the highly water-absorbent hybrid polymer in Example 2.

The obtained recording medium for business machine was tested for ink-fixing time, dot density, aptitude for OHP, rectilinear light transmittance, light-fastness, blocking properties, deliverability, and overall evaluation as described above. The results are shown in Table 2 with the results of Comparative Examples 2 and 3 described later.

Comparative Example 2

A recording medium for business machines was prepared in the same manner as in Example 1 except that polyvinyl alcohol was used in place of the polyacrylic acid in Solution A for the highly water-absorbent hybrid polymer in Example 1.

The obtained recording medium for business machine was tested for ink-fixing time, dot density, aptitude for OHP, rectilinear light transmittance, light-fastness, blocking properties, deliverability, and overall evaluation as described above.

Comparative Example 3

A recording medium for business machines was prepared in the same manner as in Example 5 except that Solution A of Example 2 only was applied on a wood-free paper sheet as the substrate.

The obtained recording medium for business machine was tested for ink-fixing time, dot density, light-fastness, blocking properties, deliverability, and overall evaluation as described above.

The results of Examples 1 to 5 are shown in Table 1, and the results of Comparative Examples 1 to 3 are shown in Table 2.

On the recording mediums of Examples 1 to 5, full-color images were recorded by use of the aforementioned four kinds of ink by the ink-jet method. As the results, a sharp color image was obtained respectively.

The present invention provides a recording medium for business machine which is excellent in ink receptability (fixability), dot density, sharpness of recorded images especially in color recording, water-resistance, light-fastness, and anti-blocking properties in comparison with the conventional recording medium. Present invention also provides a process for producing the above recording medium for business machines.

The present invention provides a recording medium for business machines for observation of images projected on a screen or the like by use of an optical device such as a lantern slide and an OHP (overhead projector); a color separation filter for preparing a positive plate of color printing; a CMF (color mosaic filter) for color display by use of liquid crystal; and so forth.

TABLE 1

| | Example 1 | Example 2 | Example 3 | Example 4 | Example 5 |
|---|---|---|---|---|---|
| Ink fixing time | | | | | |
| 10° C., 30% RH | max. 1 min | max. 1 min | max. 1 min | max. 1 min | max. 1 min |
| 20° C., 65% RH | max. 1 min | max. 1 min | max. 1 min | max. 1 min | max. 1 min |
| 26° C., 75% RH | 5 min | 3 min | max. 1 min. | max. 1 min. | max. 1 min. |
| Dot density | 1.1 | 1.0 | 1.0 | 0.9 | 0.9 |
| OHP aptitude | | | | | |
| A | A | A | — | — | — |
| B | A | A | — | — | — |
| C | A | A | — | — | — |
| Rectilinear light transmittance (%) | 88 | 87 | — | — | — |
| Light-fastness ΔE (%) | | | | | |
| Yellow ink | 0.5 | 0.6 | 0.4 | 0.7 | 0.6 |
| Magenta ink | 3.5 | 3.4 | 3.6 | 4.6 | 3.9 |
| Cyan ink | 1.9 | 1.6 | 1.7 | 3.0 | 2.8 |
| Black ink | 2.5 | 2.6 | 2.5 | 4.0 | 3.7 |
| Blocking | A | A | A | A | A |
| Deliverability 26° C., 75% RH | A | A | A | A | A |
| Overall evaluation | A | A | A | A | A |

TABLE 2

| | Comparative Example 1 | Comparative Example 2 | Comparative Example 3 |
|---|---|---|---|
| Ink fixing time | | | |
| 10° C., 30% RH | 15 min | 10 min | 5 min |
| 20° C., 65% RH | 20 min | 20 min | 15 min |
| 26° C., 75% RH | 30 min | 25 min | 20 min |
| Dot density | 0.8 | 1.0 | 0.8 |
| OHP aptitude | | | |
| A | A | A | — |
| B | A | A | — |
| C | A | A | — |

TABLE 2-continued

| | Comparative Example 1 | Comparative Example 2 | Comparative Example 3 |
|---|---|---|---|
| Rectilinear light transmittance (%) | 82 | 73 | — |
| Light-fastness ΔE (%) | | | |
| Yellow ink | 0.6 | 0.5 | 0.6 |
| Magenta ink | 3.0 | 3.2 | 3.8 |
| Cyan ink | 1.5 | 1.2 | 2.8 |
| Black ink | 2.2 | 2.0 | 3.5 |
| Blocking | C | A | B |
| Deliverability 26° C., 75% RH | B | A | A |
| Overall evaluation | C | B | B |

What is claimed is:

1. A recording medium for business machines having an ink-receiving layer provided on a substrate, the ink-receiving layer comprising a highly water-absorbent material in which a polyacrylic acid is grafted onto an alkoxide selected from inorganic alkoxides and metal alkoxides.

2. A recording medium for business machines having an ink-receiving layer provided on a substrate, the ink-receiving layer comprising a highly water-absorbent material which is formed by reactions comprising graft polymerization of a polyacrylic acid and an alkoxide selected from inorganic alkoxides and metal alkoxides.

3. A recording medium for business machines according to claim 1 or claim 2, wherein the alkoxide is selected from the group consisting of $Si(OC_2H_5)_4$, $Al(O\text{-iso-}C_3H_7)_3$, $Ti(O\text{-iso-}C_3H_7)_4$, $Zr(O\text{-t-}C_4H)_4$, $Zr(O\text{-n-}C_4H_9)_4$, $Ca(OC_2H_5)_2$, $Fe(OC_2H_5)_3$, $V(O\text{-iso-}C_3H_7)_4$, $Sn(O\text{-t-}C_4H_9)_4$, $Li(OC_2H_5)$, $Be(OC_2H_5)_2$, $B(OC_2H_5)_3$, $P(OC_2H_5)_3$, $P(OCH_3)_3$, $Mg(OCH_3)_2$ and $Mg(OC_2H_5)_2$.

4. A recording medium according to claim 1 or 2, wherein the medium has a linear light transmittance of 2% or more.

5. A recording medium according to claim 1 or 2, wherein the ink-receiving layer has a thickness of from 1 to 200 μm.

6. A recording medium according to claim 1 or 2, wherein the ink-receiving layer has a thickness of from 5 to 100 μm.

7. An imaged article having an image-bearing layer provided on a substrate, the image-bearing layer comprising a material in which a polyacrylic acid is grafted onto an alkoxide selected from inorganic alkoxides and metal alkoxides.

8. An imaged article having an image-bearing layer provided on a substrate, the image-bearing layer comprising a material which is formed by reactions comprising a material which is formed by reactions comprising graft polymerization of a polyacrylic acid and an alkoxide selected from inorganic alkoxides and metal alkoxides.

9. An imaged article according to claim 7 or 8, wherein the image is formed using a dye.

10. An image article according to claim 7 or 8, wherein the alkoxide is selected from the group consisting of $Si(OC_2H_5)_4$, $Al(O\text{-iso-}C_3H_7)_3$, $Ti(O\text{-iso-}C_3H_7)_4$, $Zr(O\text{-t-}C_4H_9)_4$, $Zr(O\text{-n-}C_4H_9)_4$, $Ca(OC_2H_5)_2$, $Fe(OC_2H_5)_3$, $V(O\text{-iso-}C_3H_7)_4$, $Sn(O\text{-t-}C_4H_9)_4$, $Li(OC_2H_5)$, $Be(OC_2H_5)_2$, $B(OC_2H_5)_3$, $P(OC_2H_5)_3$, $P(OCH_3)_3$, $Mg(OCH_3)_2$ and $Mg(OC_2H_5)_2$.

* * * * *

UNITED STATES PATENT AND TRADEMARK OFFICE

CERTIFICATE OF CORRECTION

PATENT NO. : 5,462,787

DATED : October 31, 1995

INVENTOR(S) : YAMAMOTO ET AL.

It is certified that error appears in the above-indentified patent and that said Letters Patent is hereby corrected as shown below:

COLUMN 2:
Line 1, "possibly" should read --possibly be--, and "spot." should read --spot),--.

COLUMN 3:
Line 40, "inorganic-alkoxide" should read --inorganic alkoxide--.

COLUMN 6:
Line 40, "a" should read --an--.

COLUMN 7:
Line 41, "be colorless, but may" should read --colorless, but may be--.

COLUMN 12:
Line 11, "machine" should read --machines--.

COLUMN 13:
Line 30, "claim 1 or claim 2," should read --claim 1 or 2,--; and
Line 32, "$Zr(O-t-C_4H)_4$," should read --$Zr(O-t-C_4H_9)_4$,--.

UNITED STATES PATENT AND TRADEMARK OFFICE

CERTIFICATE OF CORRECTION

PATENT NO. : 5,462,787

DATED : October 31, 1995

INVENTOR(S) : TOHRU YAMAMOTO ET AL.

It is certified that error appears in the above-indentified patent and that said Letters Patent is hereby corrected as shown below:

COLUMN 14:

Line 2, "$Be(OC_2H_5\ )_2$," should read --$Be(OC_2H_5)_2$,--; and
Line 24, "image" should read --imaged--.

Signed and Sealed this

Ninth Day of April, 1996

Attest:

Bruce Lehman

BRUCE LEHMAN

Attesting Officer

Commissioner of Patents and Trademarks